(12) United States Patent
Kinoshita

(10) Patent No.: US 6,765,609 B1
(45) Date of Patent: Jul. 20, 2004

(54) SOLID-STATE IMAGE SENSOR AND ANALYSIS SYSTEM USING THE SAME

(75) Inventor: Katsuyuki Kinoshita, Hamamatsu (JP)

(73) Assignee: Hamamatsu Photonics K.K., Shizuoka-ken (JP)

(*) Notice: Subject to any disclaimer, the term of this patent is extended or adjusted under 35 U.S.C. 154(b) by 0 days.

(21) Appl. No.: 09/577,622

(22) Filed: May 25, 2000

Related U.S. Application Data

(63) Continuation-in-part of application No. PCT/JP97/04365, filed on Nov. 28, 1997.

(51) Int. Cl.$^7$ ............................................. H04N 5/228
(52) U.S. Cl. ............................. 348/222.1; 348/227.1; 348/162; 250/390.07
(58) Field of Search ............................. 348/164, 294, 348/250, 166, 227.1, 370, 162, 222.1; 378/20, 62, 98.2, 98.8, 63, 68, 98.5; 356/300, 326, 338, 303, 456; 250/370.09, 390.07, 370.08, 363.09, 390.03

(56) References Cited

U.S. PATENT DOCUMENTS

| | | | |
|---|---|---|---|
| 3,931,462 A | * | 1/1976 | Exton ........................ 348/162 |
| 4,917,492 A | * | 4/1990 | Koishi ........................ 356/300 |
| 5,479,258 A | * | 12/1995 | Hinnrichs et al. ........... 356/326 |
| 5,528,368 A | * | 6/1996 | Lewis et al. ................. 356/456 |

FOREIGN PATENT DOCUMENTS

| | | |
|---|---|---|
| JP | 1-320441 | 12/1989 |
| JP | 05-129574 | 5/1993 |
| JP | 06-165039 | 6/1994 |

* cited by examiner

*Primary Examiner*—Vu Le
*Assistant Examiner*—Chriss Yoder
(74) *Attorney, Agent, or Firm*—Morgan, Lewis & Bockius LLP

(57) ABSTRACT

A solid-state image sensor, which has a two-dimensional matrix of a plurality of pixels used to sense the two-dimensional spatial distribution of radioactive rays, light rays, electrons, ions, or the like, is provided with an aperture that extends through a substrate at an image sensing unit on which the pixels are arranged, and a signal transfer path that connects signal transfer electrodes for reading images of the respective pixels kept clear of the aperture. Furthermore, the image sensing unit is divided into at least two regions by a boundary including the aperture, and these regions have individual signal read registers. With this structure, the image sensor serves as both an image sensor for sensing the two-dimensional distribution of radiation or the like, and an aperture for passing such radiation.

17 Claims, 12 Drawing Sheets

10 PIXELS

SOLID-STATE IMAGE SENSOR AND ANALYSIS SYSTEM USING THE SAME

RELATED APPLICATION

This is a continuation-in-part application of application Ser. No. PCT/JP97/04365 filed on Nov. 28, 1997, now pending.

BACKGROUND OF THE INVENTION

1. Field of the Invention

The present invention relates to a solid-state image sensor and, more particularly, to a solid-state image sensor used in image-observation of an object when an image observation of the object and an analysis at a specific portion of the object are simultaneously performed, and an analysis system using the same.

2. Related Background Art

An analysis of an object often requires not only observation of its image, but also measurement of spectrum energy characteristics or the like of a given portion of that image. As a system that makes such analyses (that can simultaneously obtain an image and spectral characteristics), the one described in Japanese Laid-Open Patent No. HEI 1-320441 is known. More specifically, this analysis system (luminance calorimeter) is comprised of a plate 103 with an aperture 103' on which an image of an object 101 is formed via an objective lens 102, a half mirror 111 which is inserted between the plate 103 and the object 101, and serves as a split device for partly reflecting light emitted from the object 101, a TV camera 117 as an image sensor for shooting the image of the object 101, which is reflected by the half mirror 111, a spectroscopic device 106 for spectrally resolving the light emitted from the object 101, which has passed through the plate 103 via the aperture 103', a detector 108 for detecting the spectrum obtained by the spectroscopic device 106, a data processing circuit 119 for processing the spectrum data, a signal superposing circuit 118 for superposing an analyzed data signal output from the data processing circuit 119, and an image signal output from the TV camera 117, and a monitor 110 for displaying on the basis of the signal output from the signal superposing circuit 118, as shown in FIG. 13. The analysis system splits light rays emitted from the object 101 using the half mirror 111, so that the one is used to shoot a two-dimensional image, and the other is used to detect spectral characteristics, thereby simultaneously displaying two-dimensional image b of the object, and spectral characteristic data a of a given portion of the object on the monitor 110.

However, the conventional analysis system suffers the following problem.

First, the monitor 110 displays marker c at the sampling position of the spectral characteristics in addition to two-dimensional image b and spectral characteristic data a of the object. The display position of marker c often has a deviation from the position of the object 101 where the spectral characteristics are actually detected, i.e., a measuring spot 104. That is, display of marker c is set in-correspondence with the position of light rays that have passed through the aperture 103', but the measuring spot 104 of the spectral characteristics has a deviation from marker display position c due to positional deviations of the light-receiving surfaces of the half mirror 111, TV camera 117, and the like.

Second, the half mirror 111 is used to split light rays. However, it is hard to manufacture a half mirror 111 with uniform wavelength characteristics of transmittance, and the spectral characteristics of light emitted by the object 101 change when they pass through the half mirror 111. For this reason, accurate spectral data for the object 101 cannot be obtained, resulting in poor measurement accuracy.

Third, the aforementioned analysis system can analyze if the object emits light rays, but cannot be applied to measurements of X-rays, electrons, or ions. That is, light rays can be split by the half mirror, but X-rays, an electron beam, ion beam, or the like cannot be split by the half mirror. Therefore, the system of this type cannot analyze and measure an X-ray image and the like.

SUMMARY OF THE INVENTION

The present invention has been made to solve the aforementioned problems, and has as its object to provide an analysis system which can analyze and measure radioactive rays and the like, and can obtain accurate analysis characteristics while confirming the analysis position, and a solid-state image sensor for obtaining an image to be analyzed for that system.

A solid-state image sensor of the present invention is a solid-state image sensor which converts an image that represents the spatial distribution of light such as visible light, infrared rays, ultraviolet rays, or the like, radiation such as α rays, γ rays, X-rays, or the like, an electron beam, ion particles, or the like incident on an image receiving surface into an image signal by pixels arranged in a two-dimensional matrix on a substrate. This solid-state image sensor is provided with an aperture which extends from the pixel matrix area through the substrate, and a signal transfer path for reading an image signals from each pixel kept clear of the aperture.

With this arrangement, a solid-state image sensor with an aperture around which pixels are arranged can be provided. Of these energy beams such as light, radioactive rays, electrons, ions, or the like, which have reached an image receiving surface, energy beams that have reached this aperture portion pass through the aperture.

Preferably, an image sensing unit of the solid-state image sensor is divided into at least two regions by a boundary including the aperture, and the solid-state image sensor is provided with individual registers each for respective region to read image signals from the respective pixels by transferring the image signals.

With this arrangement, the image sensing unit is divided into at least two regions by the boundary including the aperture, and these regions respectively have individual registers (normally, horizontal transfer registers). That is, this arrangement is similar to a state wherein at least two independent image sensing units are present to sandwich the aperture therebetween. When an aperture is formed at the center of an image sensing unit in a conventional solid-state image sensor, the image sensing unit of which is formed by a single region as a whole, it is hard to vertically transfer signals beyond the aperture portion. As a result, pixels which cannot undergo vertical transfer, i.e., normally pixels within a predetermined width above the aperture, become invalid pixels from which an image signal cannot be read. Since the present invention divides the image sensing unit into a plurality of regions by a boundary including the aperture portion, charges need not be vertically transferred beyond the aperture portion. That is, extra invalid pixels can be prevented from being produced.

Furthermore, the solid-state image sensor is preferably back-incident type solid-state image sensor which is provided with electrodes for transferring image signals from the pixels on an opposite side of the image receiving surface. The back-incident type solid-state image sensor can assure a broader effective entrance surface than a front-incident type solid-state image sensor, since its image receiving surface is not covered by electrodes, and also has higher conversion efficiency of incoming energy and higher sensitivity than the front-incident type.

On the other hand, an analysis system of the present invention comprises one of such solid-state image sensors, an imaging system, inserted between the image sensor and an object to be measured, for forming the image of the object on the image receiving surface of the image sensor, an analysis system for analyzing a characteristic of the object from energy beams that have passed through the aperture, and converting analyzed result into an analysis data signal, and a display device for displaying an image corresponding to the image and the analysis data on the basis of an image signal output from the image sensor and the analysis data signal output from the analysis device.

With this arrangement, the characteristics of the object are analyzed by the analysis device from energy beams that have passed through the aperture portion of the solid-state image sensor with an aperture. Therefore, the aperture position of the output image from the solid-state image sensor reliably matches the analysis position.

Furthermore, the analysis apparatus preferably further comprises marker signal generating device for generating a marker display signal to be superposed on a signal portion corresponding to the aperture in the image signal in synchronism with the image signal output from the image sensor, and the display device simultaneously displays a marker indicating an analysis position of the analysis device on the displayed image on the basis of the marker display signal output from the marker generating device. With this arrangement, the analysis position can be confirmed more easily.

The object may be set to be movable relative to the image receiving surface of the solid-state image sensor. Alternatively, the image receiving surface may be movable relative to the object. With these arrangements, the analysis position of the object can be easily scanned.

The analysis device can use a spectroscope, energy analyzer, or mass analyzer, and preferably further comprises an electron optical system for decelerating electrons or ions that have passed through the aperture of the solid-state image sensor, when the electrons or ions are to be measured. Alternatively, the analysis device may comprise a streak camera.

The imaging system may comprise an optical system including an optical lens, prism, or mirror, and at least one of the components of the optical system may be movable relative to the object or the image sensor. Alternatively, the imaging system may have a deflector for forming an arbitrary magnetic field or electric field between the object and image sensing sensor.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF PREFERRED EMBODIMENTS

Figure 1:
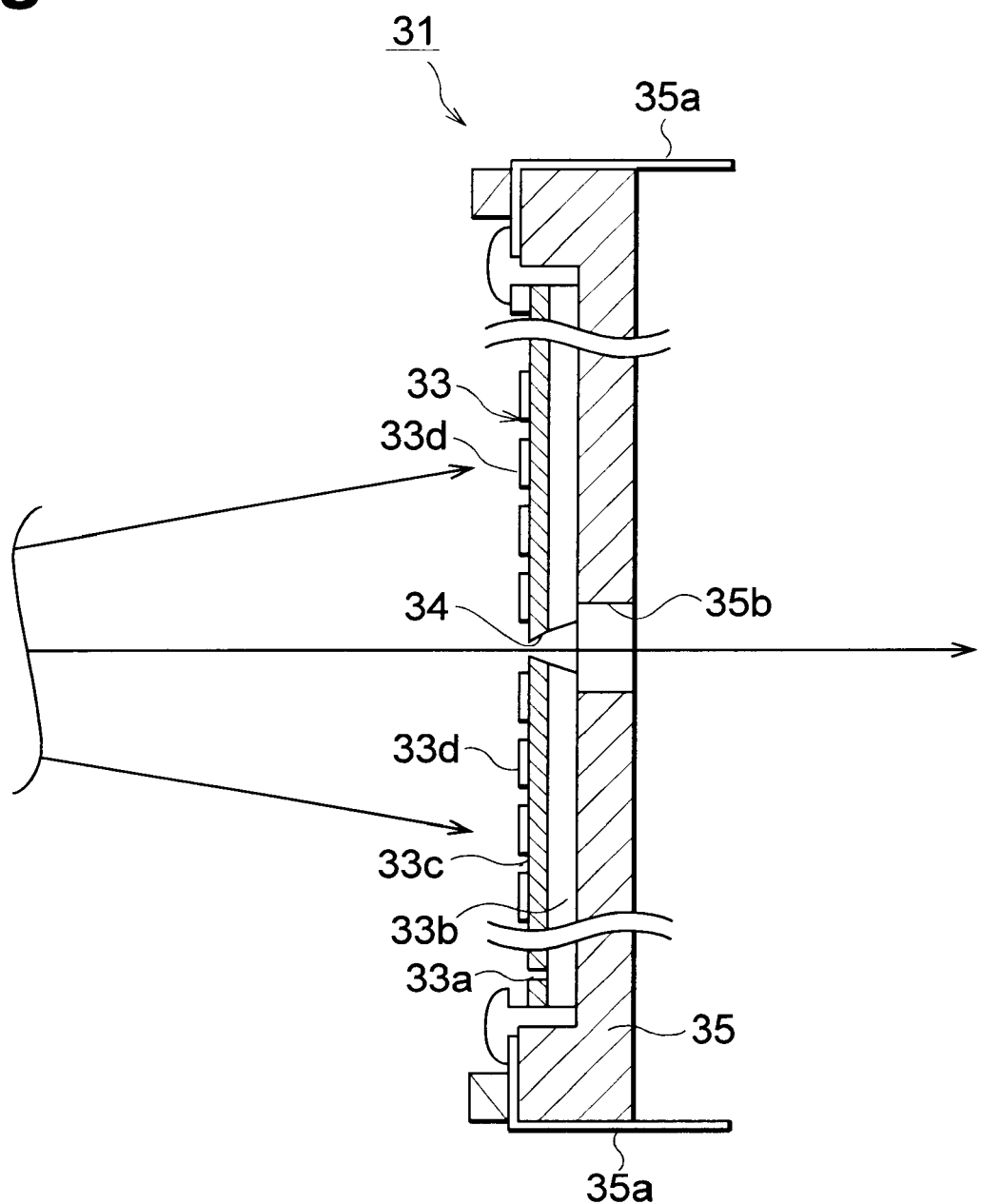
FIG. 1 is a sectional view of an embodiment of a solid-state image sensor according to the present invention.

Various embodiments of a solid-state image sensor and various analysis apparatuses using the same according to the present invention will be described hereinafter with reference to the accompanying drawings. The same reference numerals denote the same parts, where possible, throughout the drawings, and a repeated explanation will be omitted. In the respective drawings, the dimensional ratios do not always match actual ones.

Solid-state Image Sensor

An embodiment of a solid-state image sensor according to the present invention will be described first with reference to FIGS. 1 to 4.

As shown in FIG. 1, a solid-state image sensor 31 of the present invention is of a type that utilizes, e.g., a triphase-driven surface-channel type CCD (Charge Coupled Device), and has a structure in which a platy image sensing unit 33 comprised of an Si substrate and the like is attached to a package 35 consisting of an insulating material such as ceramic or the like. This image sensor will be simply referred to as the CCD 31 hereinafter. The package 35 has a plurality of terminals 35a to be electrically connected to external parts and the like of the CCD 31, and these terminals are connected to voltage supply electrodes for driving the CCD 31, signal output electrodes 33a provided to the image sensing unit 33, and the like by wire bonding.

The image sensing unit 33 has a structure in which a 0.1-μm thick SiO$_2$ film 33c is formed on the surface of a 100-μm thick p-Si substrate 33b, and a plurality of charge transfer electrodes 33d are arranged in a matrix on the SiO$_2$ film 33c. An aperture 34 extends through nearly the center of the image sensing unit 33 in the direction of its thickness. This aperture 34 can be formed by, e.g., etching. The diameter of the aperture 34 is, for example, about 96 μm when the thickness of the Si substrate 33b of the image sensing unit 33 is about 100 μm. Since normal etching is done not only in the direction of thickness of the Si substrate 33b but also in the direction of plane of the substrate 33b, the diameter of the aperture 34 becomes nearly equal to the thickness of the Si substrate 33b. For this reason, when the diameter of the aperture 34 must be smaller than the thickness of the Si substrate 33b, anisotropic etching can be used. When etching is done from the side opposite to the entrance surface of light rays and the like to the image sensing unit 33, the aperture 34 can be formed to have a smaller diameter although it has a tapered edge. Furthermore, an aperture 35b is formed in the package 35 in addition to the aperture 34 of the image sensing unit 33 so that some components of light rays or radiation can pass therethrough.

Figure 2:
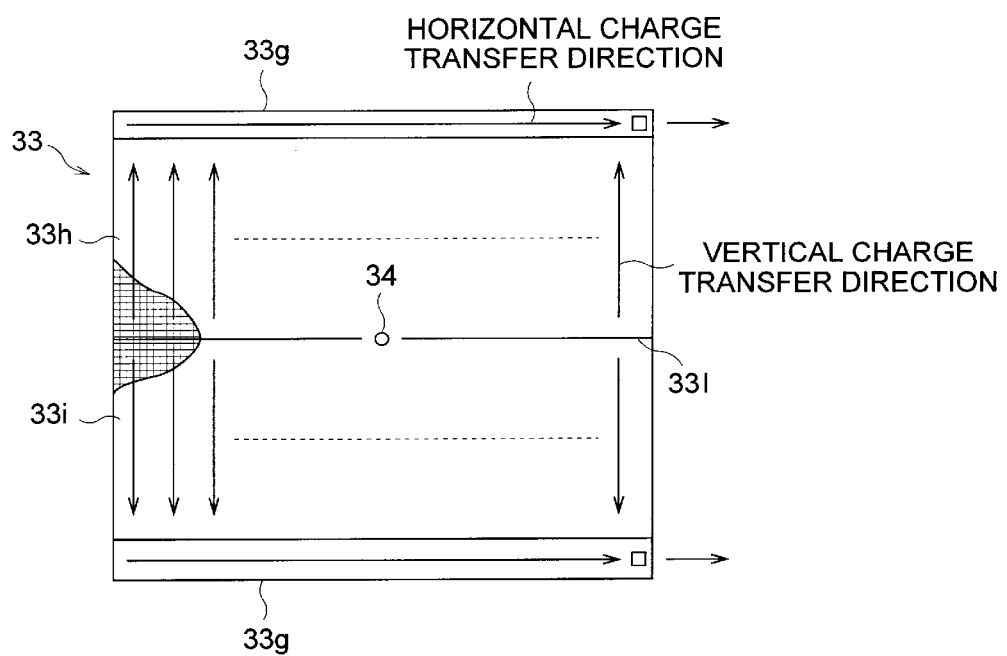
FIG. 2 is a front view of FIG. 1.
Figure 3:
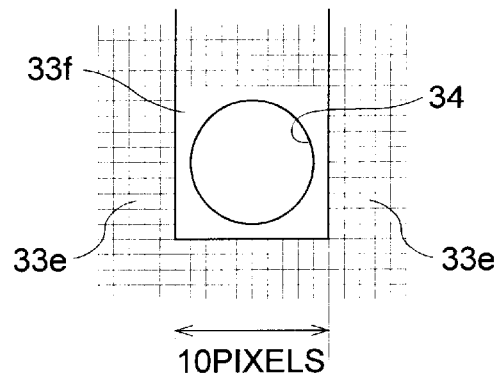
FIG. 3 is an enlarged view around an aperture portion shown in FIG. 2.
Figure 4:
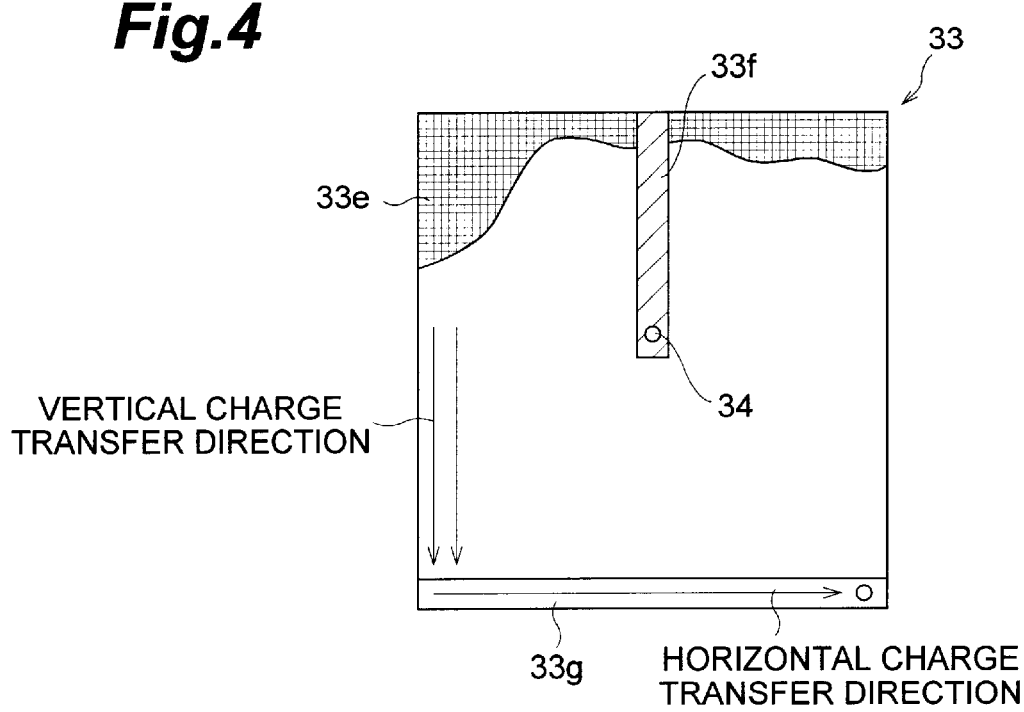
FIG. 4 shows another charge read mode of the solid-state image sensor.

The image sensing unit 33 of the CCD 31 will be described in detail below with reference to FIGS. 2 to 4. FIG. 2 is a schematic front view of the light incoming side of the image sensing unit 33, and FIG. 3 is an enlarged view around the aperture 34 of the image sensing unit 33. FIG. 4 is a schematic front view of the incident side of a comparative example of the embodiment shown in FIG. 2. In FIG. 2, the pixels 33e are not illustrated except for some of them for the sake of simplicity. As shown in FIG. 2, a large number of pixels 33e as photodiodes for making photoelectric conversion are arranged on the surface of the image sensing unit 33. For example, 1,024×1,024 pixels 33e each having a size of 12 μm×12 μm are arranged within a 12.3 mm×12.3 mm effective area of the image sensing unit 33. The layout region of the pixels 33e is divided into two, upper and lower regions 33h and 33i by a horizontal dividing line 331 that passes through the center of the aperture 34. Two horizontal transfer registers 33g for the individual regions 33h and 33i are arranged to vertically-sandwich these two regions 33h and 33i.

Note that no pixels can be formed on and around the aperture 34 of the image sensing unit 33. As shown in FIG. 3, the size of a region 33f where no pixels 33e are formed preferably corresponds to 10 pixels compared to the diameter of the aperture 34, which corresponds to around 8 pixels. In this manner, by forming the pixels 33e spaced one pixel from the edge of the aperture 34, the SiO$_2$ film 33c can be prevented from peeling and the transfer electrodes 33d can be prevented from short-circuiting due to disturbance such as blunting of the peripheral portion of the aperture 34 upon forming the aperture 34, and operation errors of the CCD 31 caused by these errors can be prevented.

In this CCD 31, the image sensing unit 33 is divided, and the individual horizontal transfer registers 33g are provided to the divided regions, as described above. Therefore, charges are vertically transferred from the respective image sensing regions 33h and 33i to the horizontal transfer registers 33g column by column, as indicated by arrows in FIG. 2, and charges are extracted from each horizontal transfer register 33g pixel by pixel, thus reading an image signal. As a result, an image signal of all pixels except for an invalid region for 10×10 pixels around the aperture can be read.

The number of divided regions is not limited to two, but may be three or more, and specific divided regions can share a horizontal transfer register.

FIG. 4 shows a comparative example of the image sensing unit 33 which has a non-divided image sensing region and an aperture. In this example, since charges cannot be vertically transferred beyond the aperture 34, an image signal cannot be read from a broader hatched region 33f than the embodiment shown in FIG. 1, and this region includes invalid pixels.

As a technique for preventing such invalid pixels from being produced on a portion other than the vicinity of the aperture, a technique which comprises dedicated accumulation sections for temporarily saving charges accumulated by the image sensing unit in addition to the image sensing unit, and providing dummy accumulation sections to those corresponding to the aperture of the image sensing unit, a technique for connecting charge transfer paths kept clear of the aperture, and the like can be applied in addition to the technique that divides the image sensing region and provides the individual charge transfer registers to the divided regions as in the embodiment shown in FIG. 2.

Figure 5:
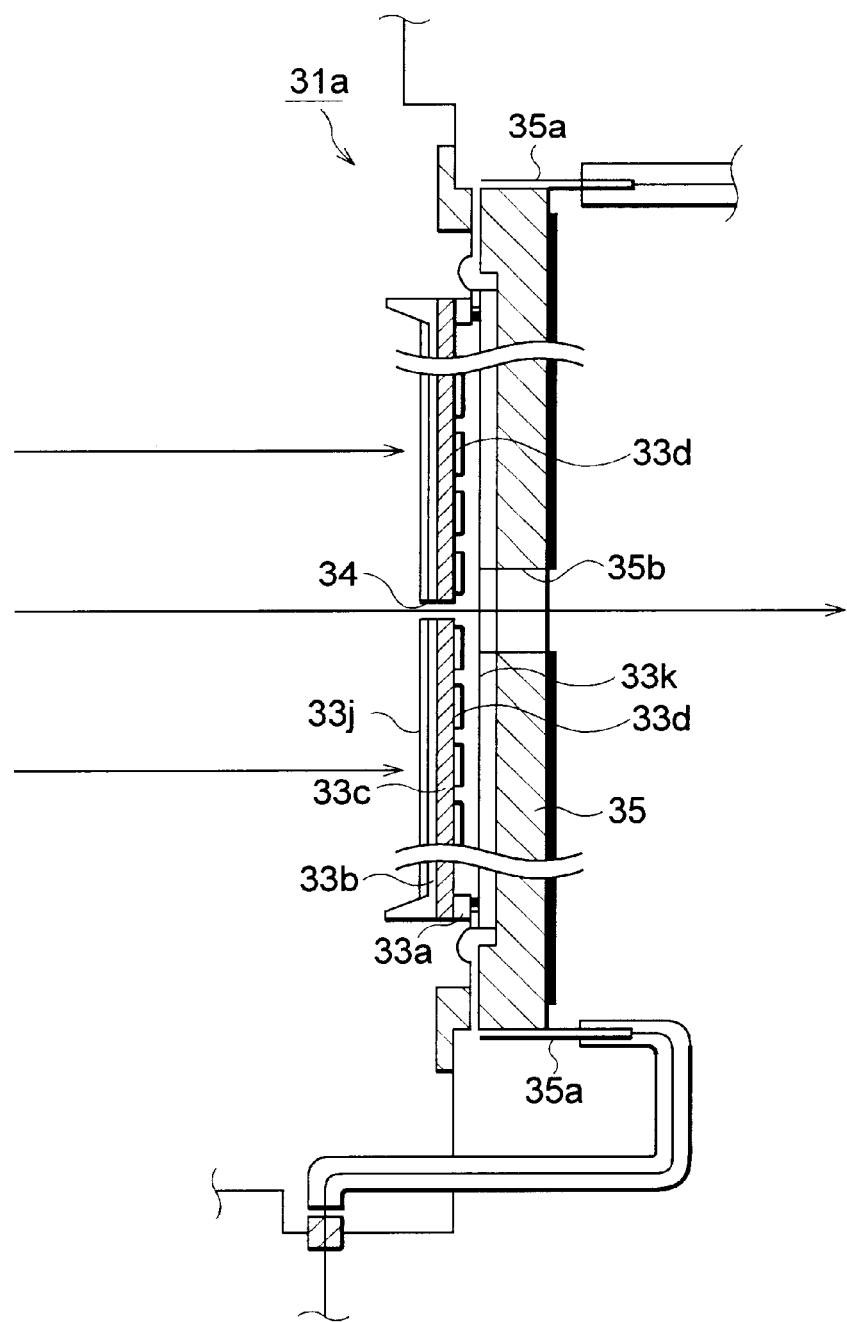
FIG. 5 is a front view of another embodiment of the solid-state image sensor shown in FIG. 1.

FIG. 5 shows the second embodiment of the solid-state image sensor of the present invention.

This CCD 31a has an aperture 34 which extends through its center, as in the aforementioned CCD 31. This CCD 31a is a so-called back-incident type CCD. That is, the CCD 31a has a structure in which a platy image sensing unit 33 comprised of an Si substrate and the like is attached to a package 35 consisting of an insulating material such as ceramic or the like. More specifically, a wiring Si substrate 33k is arranged on the front surface of the package 35, an SiO$_2$ film 33c is formed on the inner side (on the package 35 side) of an Si substrate 33b of the image sensing unit 33, and a large number of charge transfer electrodes 33d are arranged on that SiO$_2$ film 33c. A p$^+$-Si layer 33j is formed on the outer side (the incoming side of photoelectrons) of the Si substrate 33b.

Upon receiving an electron beam or soft X-ray, since the CCD 31a absorbs it by the surface of the image sensing unit 33 to generate signal charges, it has a structure in which the Si substrate 33b is formed to have a thickness as small as about 20 μm so that signal charges can effectively reach the bottom surfaces of the transfer electrodes 33d that accumulate and transfer these charges, and only a thick edge portion of the Si substrate 33b is left for support. Also, the p$^+$-Si layer 33j is formed by ion implantation on the surface side where electrons are injected, so that generated charges are efficiently transferred to the transfer electrode side. According to such back-incident type CCD 31a, since the Si substrate 33b has a thickness as small as about 20 μm, the aperture 34 can be formed by, e.g., etching to have a diameter of around 24 μm accordingly. Also, since this CCD is of back-incident type, the electrodes 33d never shield the entrance surface, and the effective area of the entrance surface increases in practice, thus efficiently sensing an image of an object.

Note that the CCD can be of triphase-driven type, or dual or quadruple phase-driven type, and is not limited to the frame transfer type, but may be of interline transfer type or frame interline transfer type. Furthermore, the solid-state image sensor is not limited to a CCD, but may be a MOS sensor. And the aperture may be located the-position excess the center position of the pixel matrix and the aperture should be surrounded by the pixels.

Analysis Systems

Examples of various analysis systems using the solid-state image sensor with the above arrangement will be described in detail below. Note that examples using the CCD will be explained below, but the present invention is not limited to such specific examples, and various solid-state image sensors with an aperture can be applied, as described above.

(First Embodiment)

Figure 6:
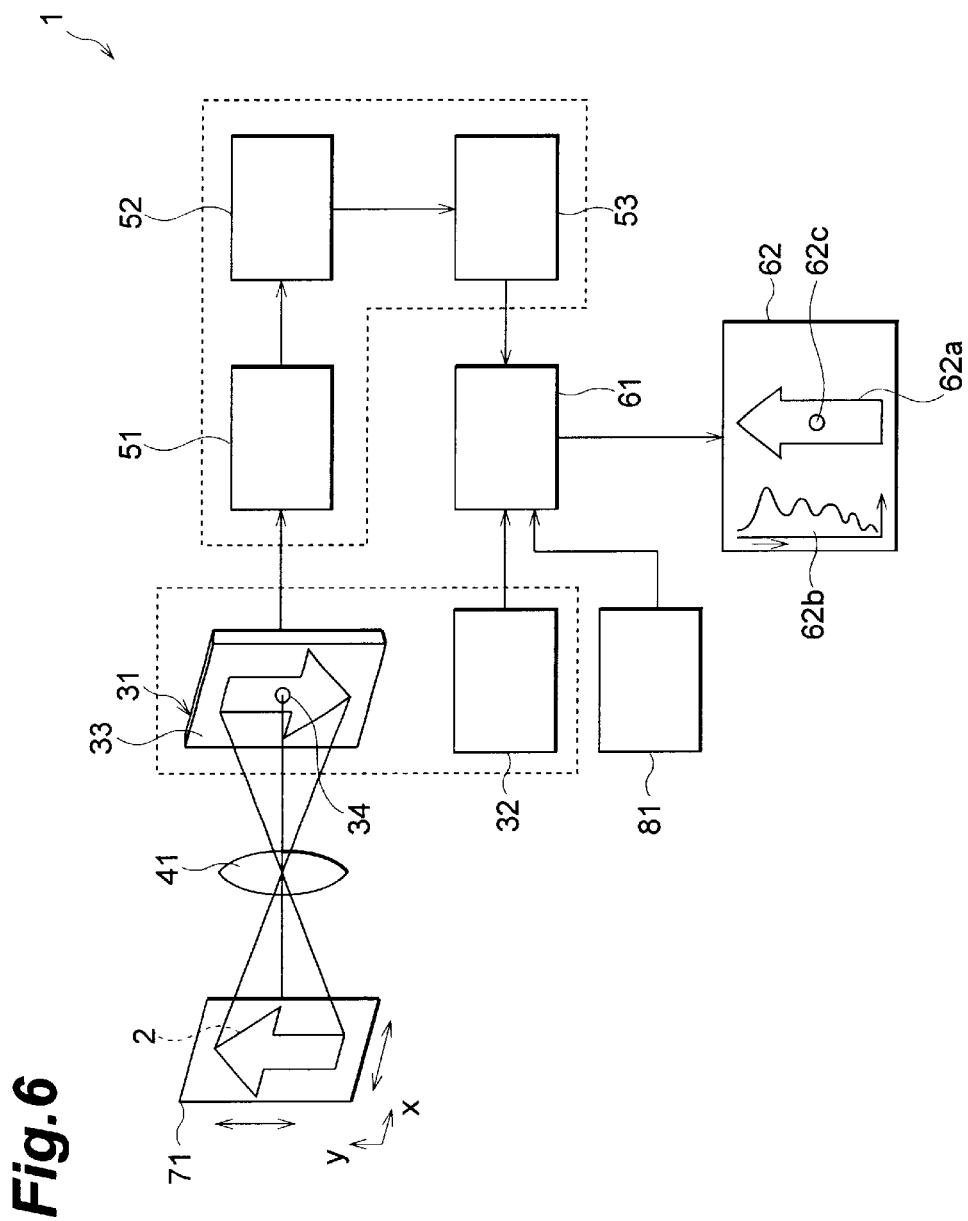
FIG. 6 is an explanatory view of an analysis system according to the present invention.

FIG. 6 is an overall schematic view of an analysis system 1. As shown in FIG. 6, the analysis system 1 is a system which can accurately analyze colors at a specific position of an object 2 to be measured while observing the shape of the object 2, comprises a CCD 31 which serves as an image sensor, a CCD driving circuit 32, an optical lens system 41 which serves as an imaging system, a spectroscope 51 which serves as an analysis device, a detector 52, a data processing circuit 53, and a signal superposing circuit 61 and monitor 62, which serve as a display device, and also comprises an X-Y stage 71 on which the object 2 is placed, and a marker signal generator 81 which serves as a marker signal generating device.

Note that the CCD 31 is one of the aforementioned solid-state image sensors of the present invention and, for example, any sensor of the embodiment shown in FIGS. 1 to 3 can be applied.

The respective units of the analysis system 1 will be explained in detail below. The X-Y stage 71 on which the object 2 as a measurement target is placed is provided to be movable in the direction of plane perpendicular to the optical axis. That is, the X-Y stage 71 has a placing surface of the object 2, which is nearly parallel to an image sensing unit 33 as the image receiving surface of the CCD 31, and is movable at least in a direction parallel to that placing surface. For this reason, the object 2 placed on the X-Y stage 71 is movable relative to the CCD 31, and the respective portions of the object 2 can be sensed by the CCD 31 as a result of this movement. In order to sense the respective portions of the object 2, the X-Y stage 71 and CCD 31 need only be movable relative to each other. For example, the X-Y stage 71 may be fixed in position, and the CCD 31 may be movable with respect to the X-Y stage 71. Also, both the X-Y stage 71 and CCD 31 may be movable. Furthermore, the X-Y stage 71 or CCD 31 may be translated to each other or may move in a direction to approach or separate from each other.

The CCD driving circuit 32 is connected to the CCD 31. The CCD driving circuit 31 controls driving of the CCD 31, and receives and amplifies a video signal output from the CCD 31. The optical lens system 41 is inserted between the X-Y stage 71 and CCD 31, and images light rays or radioactive rays emitted from the object 2 on the CCD 31. If this optical lens system 41 is movable with respect to the object 2 or the CCD 31, the imaging position of light rays or the like can be changed without moving the X-Y stage 71 or CCD 31. Note that light rays or radioactive rays emitted from the object 2 include those which are spontaneously produced by the object 2 itself, and those which irradiated on the object 2 and are reflected thereby.

The spectroscope 51 that partially constructs the analysis means is disposed behind the CCD 31. The spectroscope 51 separates light rays that have passed through the aperture 34 of the CCD 31 to produce a spectrum, and uses a prism, diffraction grating, color filter, or the like. The detector 52 is connected to the output side of the spectroscope 51. The detector 52 is a device for reading the spectrum of light rays produced by the spectroscope 51, and outputs an electrical signal corresponding to the wavelength spectrum of light rays upon receiving light rays. As this detector 52, a multi-channel detector or the like is used. The data processing circuit 53 is connected to the output side of the detector 52.

The data processing circuit 53 is a circuit that processes wavelength spectrum data output from the detector 52, and outputs an analysis data signal.

Furthermore, the signal superposing circuit 61 that forms the display device is connected to the output side of the data processing circuit 53. The signal superposing circuit 61 is also connected to the CCD driving circuit 32 and marker signal generator 81 in addition to the data processing circuit 53, and has a function of receiving and superposing a video signal from the CCD driving circuit 32, an analysis data signal from the data processing circuit 53, and a marker display signal from the marker signal generator 81. The monitor 62 is a device which receives a signal output from the signal superposing circuit 61, and simultaneously displays a two-dimensional image 62a of the object 2, analysis data 62b, and a marker 62c indicating the analysis position (sampling position). The monitor 62 can use a known one.

The marker display signal generated by this marker signal generator 81 is synchronous with the video signal output from the CCD driving circuit 32, and is superposed on a signal portion corresponding to the aperture 34 of that video signal. Since the signal portion corresponding to the aperture 34 in the video signal output from the CCD driving circuit 32 can be specified based on the position of the aperture 34, the marker display signal can be easily and accurately superposed on the signal portion corresponding to that aperture 34 by taking synchronization with the video signal.

The operation of the analysis system 1 will be explained below.

As shown in FIG. 1, the object 2 as a measurement target is set on the X-Y stage 71. In this state, light rays emitted from the object 2 are imaged on the image sensing unit 33 of the CCD 31 via the optical lens system 41. In this case, light rays emitted from the object 2 may be those reflected by the object 2 irradiated with predetermined light. Since no half mirror or the like is present between the X-Y stage 71 and CCD 31, the wavelength characteristics of an image of light rays emitted from the object 2 never change.

The CCD 31 performs photoelectric conversion in accordance with a light ray image of the object 2 formed on the image sensing unit 33, and outputs an electric video signal corresponding to the light ray image. The video signal is transferred from the CCD 31 to the CCD driving circuit 32, which amplifies and outputs the video signal.

On the other hand, some of the light rays that form the image of the object 2 formed on the CCD 31 travel past the CCD 31 via the aperture 34. Light rays that have passed through the CCD 31 enter the spectroscope 51 as sampling light rays for analysis. The spectroscope 51 separates light rays in units of wavelength bands, which are detected by the detector 52 as signals corresponding to intensities in units of wavelengths. The signals output from the detector 52 are input to the data processing circuit 53, which outputs an analysis data signal of intensity data of the separated wavelength.

Figure 7:
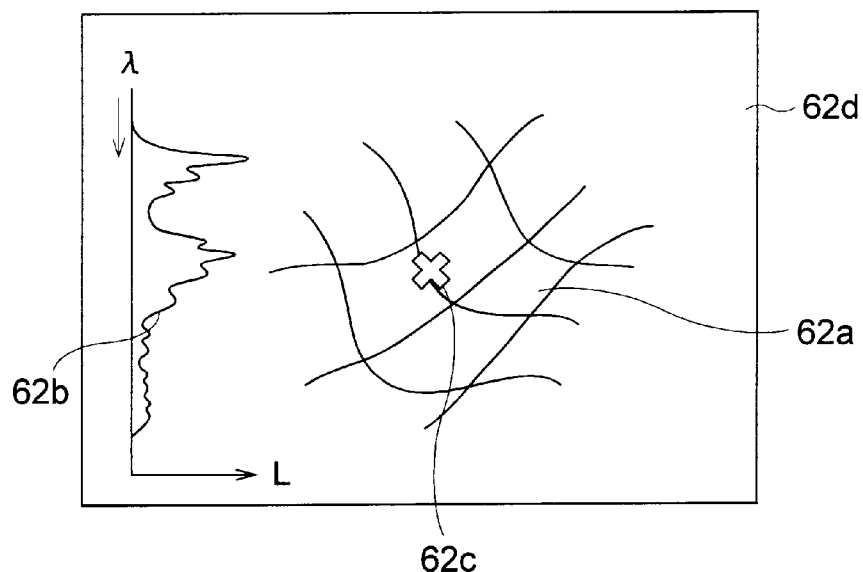
FIG. 7 is an explanatory view that illustrates an output image of the analysis system shown in FIG. 6.

The video signal output from the CCD driving circuit 32, the analysis data signal output form the data processing circuit 53, and the marker display signal output from the marker signal generator 81 are input to the signal superposing circuit 61, which superposes them and inputs the superposed signal to the monitor 62. In this case, the marker display signal is superposed on the signal portion of the aperture 34 in the video signal. The signal superposing circuit 61 outputs the superposed signal of the input signals to the monitor 62, which simultaneously displays the two-dimensional image 62a of the object 2 on the basis of the video signal component, the analysis data 62b that indicates spectra in units of wavelength bands on the basis of the analysis data signal component, and the marker 62c indicating the analysis position of the analysis data 62b on the two-dimensional image 62a, as shown in FIG. 7. At this time, since the marker 62c is displayed at the aperture position of the image sensing unit 33, it always matches the analysis position of the analysis data, and indicates an accurate position.

Also, since the monitor 62 simultaneously displays the two-dimensional image 62a of the object 2, the analysis data 62, and the marker 62c indicating the analysis position, observation of the surface shape of the object 2, and measurement of color data (e.g., spectral intensities in units of wavelength bands) at a desired position on the object 2 can be done at the same time, and the state, nature, and the like of the object 2 can be easily recognized. Upon observation and measurement of the object 2, when the position to be analyzed is to be changed, the X-Y stage 71 on which the object 2 is set is moved relative to the CCD 31, thus easily changing the analysis position. In this case, the CCD 31 may be moved relative to the X-Y stage 71. As a result of such movement, a position indicated by the marker 62c relative to the two-dimensional image 62a of the object 2 changes. In this case, if that movement is randomly made to an arbitrary position, since the marker 62c always indicates the position of the aperture 34, the position indicated by the marker. 62c never deviates from the position where actual analysis is made (analysis sampling position). When the X-Y stage 71 or the like is moved while observing the two-dimensional image 62a of the object 2, the desired position can be adjusted to the position of the aperture 34. For this reason, the desired position of the object 2 can be efficiently analyzed, and the capture time of analysis data cap be greatly shortened. On the other hand, when analysis data is to be obtained across a broad range of the two-dimensional image 62a of the object 2, the movement of the X-Y stage 71 or the like is controlled upon observation and measurement of the object 2 to automatically scan the analysis position in turn on the object 2, thus efficiently measuring the respective portions of the object 2.

As described above, according to this analysis system 1, observation of the two-dimensional image 62a of the object 2 and analysis of a desired position can be simultaneously done, and in this case, the analysis position is accurately indicated by the marker 62c. Also, light rays emitted from the object 2 can be sampled without the intervention of any object that changes the characteristics of light rays, e.g., a half mirror or the like. Therefore, the object 2 can be analyzed accurately as well as its observation.

The aforementioned analysis system 1 may display the two-dimensional image 62a of the object 2 and analysis data 62b on different display means. That is, the analysis data signal output from the data processing circuit 53 need not always be superposed by the signal superposing circuit 61, and the two-dimensional image 62a of the object 2 and analysis data 62b may be displayed on different display means by connecting a display means such as a monitor, X-Y plotter, or the like to the data processing circuit 53 in addition to the monitor 62 connected to the signal superposing circuit 61.

(Second Embodiment)

The second embodiment of the analysis system will be explained below with reference to FIGS. 8 and 9. The analysis system 1 according to the first embodiment allows the user to observe the two-dimensional image of light rays emitted from the object 2, and to measure the color characteristics at a specific position of the object 2. By contrast, the second embodiment is directed to an analysis system having a photoelectron spectroscopic function, which observes a two-dimensional image of photoelectrons emitted from the object 2, and measures energy characteristics of the photoelectrons.

Figure 8:
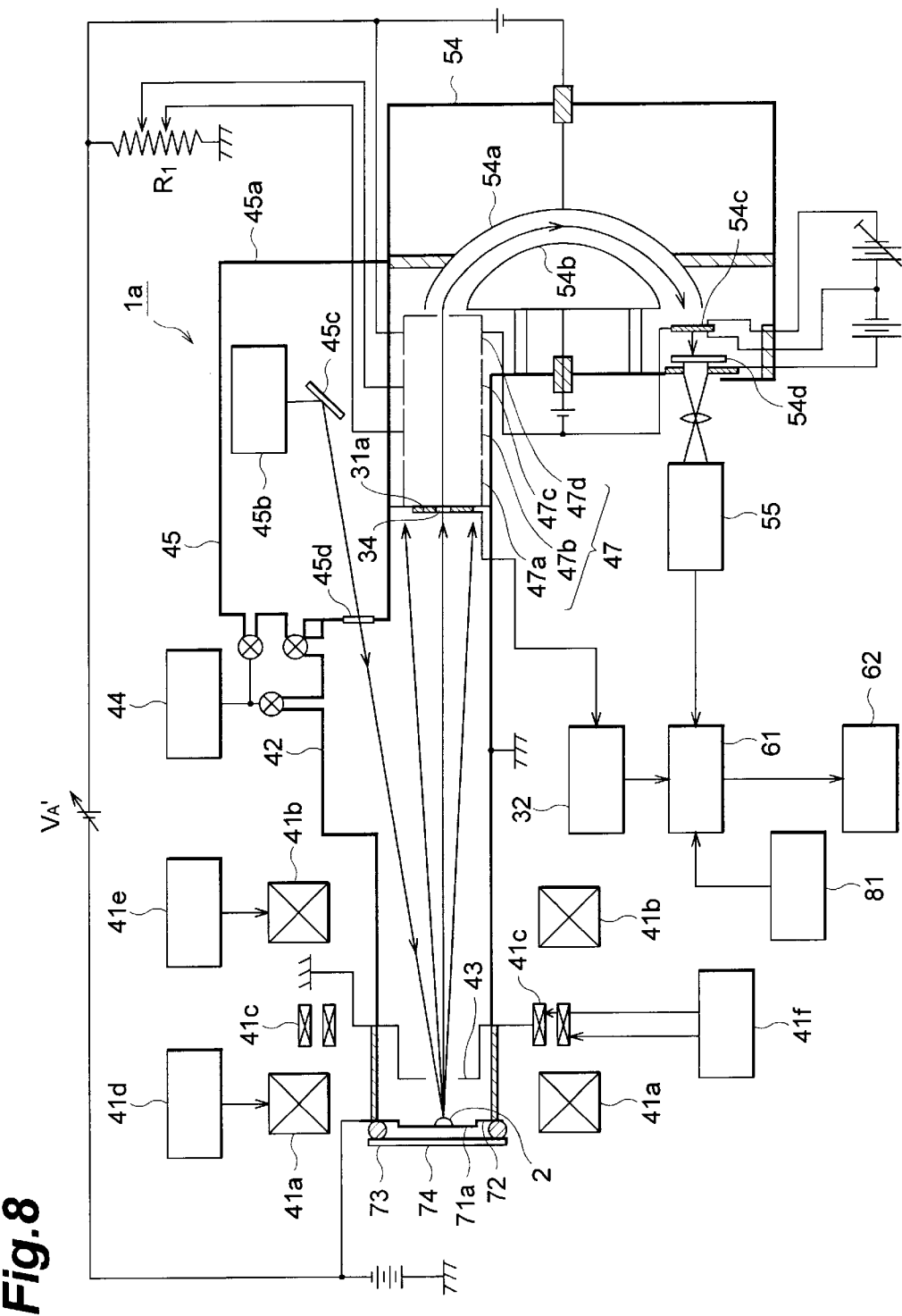
FIG. 8 is an explanatory view of a spectral analysis system as the second embodiment of the analysis system according to the present invention.

As shown in FIG. 8, an analysis system 1a comprises a CCD 31a which serves as an image sensor, a CCD driving circuit 32, a first focusing coil 41a, a second focusing coil 41b, and a deflection coil 41c which serve as an imaging system, a semispherical energy analyzer 54 as an analysis device, a TV camera 55, and a signal superposing circuit 61 and monitor 62 which serve as a display device, and also comprises an X-ray generator 45 for making the object 2 emit photoelectrons, and a marker signal generator 81 which serves as a marker signal generating device.

The respective units of the analysis system 1a will be explained in detail below. A sample support table 71a on which the object 2 as a measurement target is placed is arranged at the end portion of a vacuum chamber 42. The sample support table 71a uses a planar one which consists of a non-magnetic member, e.g., a non-magnetic metal. The sample support table 71a can be freely attached/detached to/from a fixing ring 72 having conductivity, and is placed at an opening of the vacuum chamber 42 while being attached to the fixing ring 72. The fixing ring 72 is pressed by an airtight cap 74 via an O-ring 73, and vacuum-seals the opening of the vacuum chamber 42. For this reason, when the object 2 is set on the sample support table 71a, it is placed inside the vacuum space. By removing the airtight cap 74, the object 2 set on the sample support table 71a can be replaced by another. A high-voltage source is connected to the fixing ring 72, and applies a negative potential, e.g., a voltage of −10 kV thereto, which is also applied to the sample support table 71a connected to the fixing ring 72. A vacuum pump 44 is connected to the vacuum chamber 42, so that the degree of vacuum of the interior of the vacuum chamber 42 can be arbitrarily adjusted. The vacuum chamber 42 is set in a vacuum of $1 \times 10^{-4}$ Torr or less in normal use.

An acceleration electrode 43 is spaced inwardly from the sample support table 71a at in the vacuum chamber 42. The acceleration electrode 43 is electrically connected to the side wall of the vacuum chamber 42, and is set at a potential of ±0 kV since the vacuum chamber 42 is connected to ground. The acceleration voltage 42 has an aperture through which photoelectrons or the like can pass. As a result, photoelectrons which have emission energy $V_0$ (eV) and emitted from the object are accelerated to a velocity corresponding to energy of $V_0 + 10^4$ (eV) by an acceleration electric field formed between the sample support table 71a and acceleration electrode 43.

On the other hand, the CCD 31a is disposed on the side opposite to the sample support table 71a to sandwich the acceleration electrode 43 therebetween. The CCD 31a is a solid-state image sensor which receives and photoelectrically converts an image of photoelectrons emitted from the object 2, and outputs an electrical video signal. This CCD 31a uses the aforementioned CCD 31a of the second embodiment shown in FIG. 4.

The CCD driving circuit 32 is connected to the CCD 31a as in the analysis system 1 of the first embodiment. The CCD driving circuit 32 controls driving of the CCD 31a, and can amplify a video signal output from the CCD 31a.

The X-ray generator 45 is arranged in the neighborhood of the vacuum chamber 42. The X-ray generator 45 is a device for irradiating the object 2 with soft X-rays, and has a structure in which a gas-puff X-ray source 45b and reflection mirror 45c are disposed inside a vacuum chamber 45a. The vacuum chamber 45a is connected to the aforementioned vacuum pump 44, so that the degree of vacuum of its interior can be arbitrarily adjusted. A transmission window 45d is formed on the side wall of the vacuum chamber 45a, and soft X-rays can be sent from the interior of the vacuum chamber 45a toward the object 2 on the sample support table 71a. The reason why the transmission window 45d is formed is to partition the interior of the vacuum chamber 42, which must be maintained at a high degree of vacuum, from the vacuum chamber 45a since the degree of vacuum of the vacuum chamber 45a is low due to the presence of the gas-puff X-ray source. As the transmission window 45d, a thin film that transmits only soft X-rays, for example, an organic film, silicon nitride film, or the like supported by a lattice-like support member is used. The reflection mirror 45c reflects X-rays output from the gas-puff X-ray source 45b toward the transmission window 45d, and also has a spectroscopic function of X-rays to be reflected. That is, the reflection mirror 45c has a function of reflecting only soft X-rays of X-rays emitted from the gas-puff X-ray source 45b. According to this X-ray generator 45, the object 2 on the sample support table 71a, which is arranged inside the vacuum chamber 42, can be irradiated with soft X-rays.

The first and second focusing coils 41a and 41b are laid out around the vacuum chamber 42, and driving power sources 41d and 41e are respectively connected thereto. When these first and second focusing coils 41a and 41b are energized, a magnetic field is formed inside the vacuum chamber 42. Then, a group of photoelectrons which are emitted from the object 2 upon irradiation of soft X-rays and are accelerated by the acceleration electric field formed between the sample support table 71a and acceleration electrode 43 can be imaged on the CCD 31a. Furthermore, the deflection coil 41c is arranged around the vacuum chamber 42, and a driving power source 41f is connected thereto. When the deflection coil 41c is energized by the driving power source 41f, it can arbitrarily control the shape of the magnetic field. For this reason, a group of photoelectrons emitted from the object 2 can be imaged at a desired position on the CCD 31a under the magnetic field formation control of the deflection coil 41c.

An electron optical system 47 is arranged behind the CCD 31a. The electron optical system 47 comprises, e.g., a group of a plurality of cylindrical electrodes 47a, 47b, 47c, and 47d. The electrode 47a is grounded to ±0 V, and the electrode 47d is applied with a voltage of −9.85 kV $V_A{}'$ (e.g., 150 V) higher than the voltage applied to the fixing ring 72. The intermediate electrodes 47b and 47c are applied with a predetermined voltage between the ground potential and that potential of −9.85 kV. With this arrangement, electrons accelerated by the acceleration electrode 43 are decelerated to a velocity close to an initial velocity when they are emitted from the object 2, i.e., to a velocity corresponding to $V_0+V_A{}'$ (eV) by the electron optical system 47.

Behind the electron optical system 47, the semispherical energy analyzer 54 which partially constructs the analysis device is arranged. The energy analyzer 54 is a device for analyzing the energy of photoelectrons that have passed through the electron optical system 47, and is constructed by semispherical electrodes 54a and 54b, one end portions of which are located behind the electron optical system 47, and which are concentrically arranged, and a micro-channel plate 54c and fluorescent plate 54d, which are placed at the other end side of these electrodes 54a and 54b. The electrode 54a on the outer circumferential side and the electrode 54b on the inner circumferential side are respectively applied with voltages of −9.95 kV and −9.75 kV, which become negative and positive voltages with respect to the potential (−9.85 kV) of the electrode 47d on the terminal end side of the electron optical system 47, so as to form an electric field that extends from the electrode 54a to the electrode 54b, thus circularly moving photoelectrons that enter between the electrodes 54a and 54b along these electrodes 54a and 54b. The entrance surface of the micro-channel plate 54c is set at the same potential as that of the electrode 47d, and the exit surface of the micro-channel plate 54c and the fluorescent plate 54d are respectively applied with positive voltages with respect to the potential of the entrance surface of the micro-channel plate 54c, so that the entrance surface and exit surface of the micro-channel plate 54c and the fluorescent plate 54d have potentials in turn in ascending order.

According to this energy analyzer 54, the aperture 34 of the CCD 31a serves as an entrance pupil function to receive photoelectrons, which have passed through the aperture 34 of the CCD 31a, between the electrodes 54a and 54b, and the energy distribution of photoelectrons can be detected exploiting the fact that the radii of paths of the photoelectrons change in the electric field depending on their energy levels.

In this analysis system 1a, the TV camera 55 is disposed to face the fluorescent plate 54d of the energy analyzer 54. This TV camera 55 senses light emitted from the fluorescent plate 54d. An analysis video signal (analysis data signal) output from the TV camera 55 is input to the signal superposing circuit 61. The video signal output from the aforementioned CCD driving circuit 32 and a marker display signal output from the marker signal generator 81 are also input to the signal superposing circuit 61, which superposes the input signals to obtain a signal to be input to the monitor 62. Note that the signal superposing circuit 61, monitor 62, and marker signal generator 81 use the same ones as those in the first embodiment.

The operation of the analysis system 1a will be explained below.

The object 2 as a measurement target is set on the sample support table 71a. The interiors of the vacuum chamber 42, vacuum chamber 45a, and energy analyzer 54 are set in vacuum by the vacuum pump 44. The first and second focusing coils 41a and 41b, and the deflection coil 41c are respectively energized by the driving power sources 41d, 41e, and 41f, and predetermined voltages are applied to the electrodes 47a, 47b, and 47c of the electron optical system 47, the fixing ring 72, the electrodes 54a and 54b, the micro-channel plate 54c, and fluorescent plate 54d. In this state, X-rays are output from the gas-puff X-ray source 45d, and are reflected by the reflection mirror 45c, so only soft X-rays emerge from the transmission window 45d. Then, the surface of the object 2 on the sample support table 71a is irradiated with these soft X-rays. Upon irradiation of soft X-rays, a group of photoelectrons are emitted from the surface of the object 2 in accordance with its characteristics. The group of photoelectrons pass through the aperture of the acceleration electrode 43 by the magnetic field formed by the first and second focusing coils 41a and 41b, and the acceleration electric field formed between the sample support table 71a and acceleration electrode 43, and travel toward the CCD 31a, thus forming an image on the CCD 31a.

Subsequently, the CCD 31a performs photoelectric conversion in accordance with the photoelectron image of the object 2 formed thereon, and outputs an electrical video signal corresponding to the photoelectron image. The video signal is transferred to the CCD driving circuit 32 outside the vacuum chamber 42, and is amplified. The amplified video signal is then output from the CCD driving circuit 32. On the other hand, some of photoelectrons that form an image of the object 2 on the CCD 31a travel past the CCD 31a through the aperture 34. In this case, since the aperture 34 is formed on the CCD 31a, some of photoelectrons that cannot be split by a half mirror or the like can be sampled. The photoelectrons that traveled past the CCD 31a are decelerated by the electron optical system 47 and enter the energy analyzer 54. That is, the photoelectrons which have passed through the aperture 34 and are decelerated by the electron optical system 47 enter between the electrodes 54a and 54b, and move along a circular path by the electric field between the electrodes 54a and 54b. In this case, since the radius of the circular path increases with increasing energy level, i.e., velocity of a photoelectron and decreases with decreasing velocity, the radii of paths change depending on the energy levels of photoelectrons. Therefore, the photoelectrons that have left between the electrodes 54a and 54b strike the micro-channel plate 54c at different positions, and the energy levels of the photoelectrons can be measured by those positions. Since the photoelectrons are amplified by the micro-channel plate 54c and then become incident on the fluorescent plate 54d, they are converted by the fluorescent plate 54d into light, thus forming a profile of electron spectrum. The profile of electron spectrum is sensed by the TV camera 55, and is output from the TV camera 55 as an electrical analysis data signal.

The video signal output from the CCD driving circuit 32, the analysis data signal output from the TV camera 55, and the marker display signal output from the marker signal generator 81 are input to the signal superposing circuit 61, which superposes the input signals and inputs the superposed signal to the monitor 62. In this case, the marker display signal is superposed on the signal portion of the aperture 34 in the video signal. The signal superposing circuit 61 outputs the superposed signal of the input signals to the monitor 62, which displays a two-dimensional image of the object 2 on the basis of the video signal component, the profile of electron spectrum on the basis of the analysis data signal component, and the marker indicating the analysis position.

Furthermore, when the deflection coil 41c is energized by the driving power source 41f, a photoelectron image from the object 2 is moved on the CCD 31a, and the position to be analyzed is adjusted to the aperture 34 of the CCD 31a, thus obtaining analysis data at a desired position.

In this manner, according to the analysis system 1a, since the two-dimensional image of the object 2, the analysis data, and the marker indicating the sampling position are simultaneously displayed, observation of the surface shape of the object 2, and measurement of the profile of electron spectrum at a desired position on the object 2 can be simultaneously done, and the state, nature, and the like of the object 2 can be easily recognized. Therefore, the apparatus of this embodiment is effective for measurement of a photoelectron spectrum.

The aforementioned analysis system 1a may display the two-dimensional image of the object 2 and analysis data on different display means. That is, the analysis data signal output from the data processing circuit 53 need not always be superposed by the signal superposing circuit 61, and the two-dimensional image of the object 2 and analysis data may be displayed on different display device by connecting a display devices such as a monitor, X-Y plotter, or the like to the data processing circuit 53 in addition to the monitor 62 connected to the signal superposing circuit 61.

Figure 9:
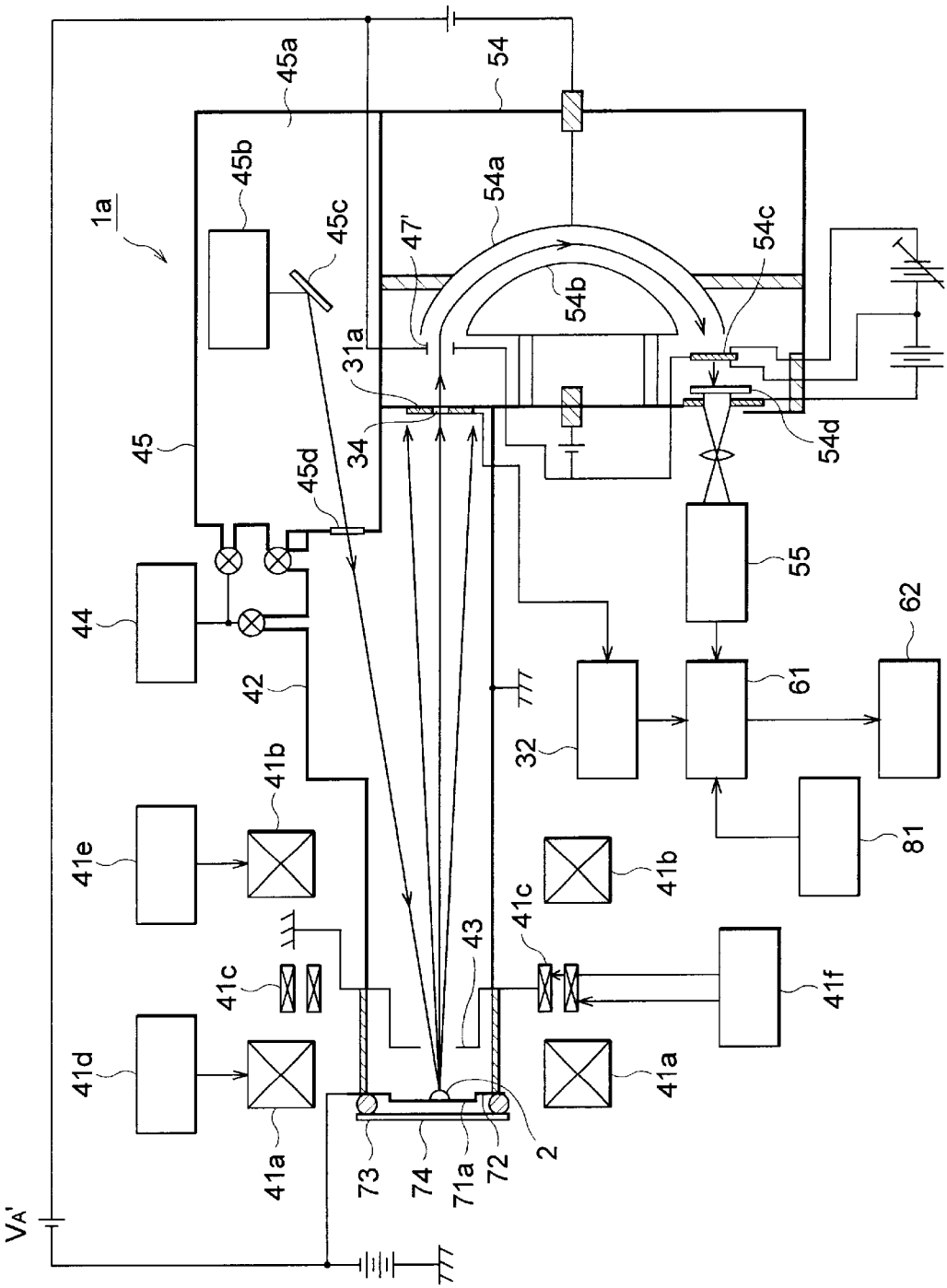
FIG. 9 is an explanatory view showing a modification of the second embodiment.

FIG. 9 shows an analysis system 1a' as a modification of this analysis system. The difference between this system and the aforementioned analysis system 1 is only that between the electron optical systems 47 and 47'. In the analysis system 1 shown in FIG. 8, photoelectrons are decelerated using the plurality of cylindrical electrodes 47a to 47d. However, the analysis system 1a' shown in FIG. 9 is characterized by immediately decelerating photoelectrons using only an electrode 47' applied with −9.85 kV. In this case, the structure can be simple.

In order to sense an electron image by the CCD 31a, electrons are preferably accelerated to about 10 keV. As a result, the signal conversion efficiency of photoelectrons in the CCD can be improved, and the spatial resolution of the formed image can also be improved. However, when such high-speed electrons enter the semispherical energy analyzer 54, since electrons traverse the interior of the semisphere at high speed, the paths of electrons change less by the internal electric field, resulting in low energy resolution. Therefore, it is preferable to provide the deceleration electron optical system, as described above.

The substrate potential of the CCD 31a may be set at high voltage (e.g., +10 kV), and the fixing ring 72 and the terminal end electrode of the electron optical system 47 may be set at a potential of $+V_A'$ (e.g., +150 V) close to the ground potential. In this case, the CCD 31a must be driven at positive high-voltage potential, but the large-scale semispherical energy analyzer can be driven at low-voltage potential.

(Third Embodiment)

The third embodiment of the analysis system will be explained below based on FIGS. 10 and 11. The third embodiment is directed to an analysis system which observes an image of ions emitted by the object 2, and analyzes the type and quantity of ions emitted. For example, an analysis function is added to an atom probe field-ion microscope in addition to observation of an image of the object 2.

Figure 10:
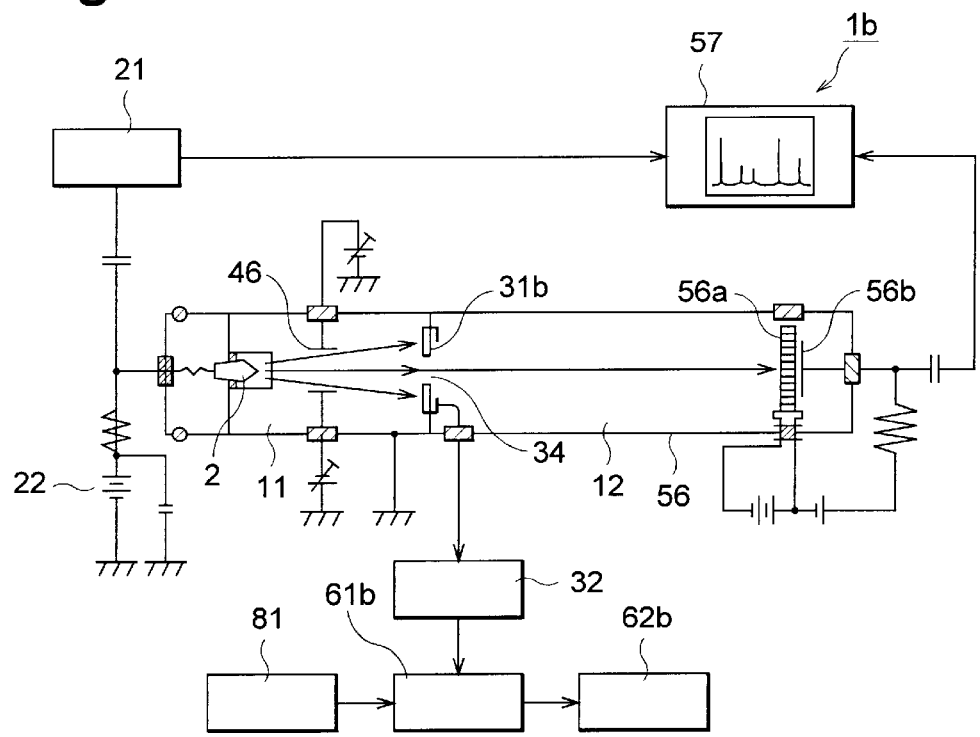
FIG. 10 is an explanatory view of an atom probe field-ion microscope as the third embodiment of the present invention.
Figure 11:
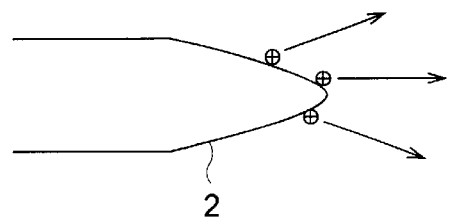
FIG. 11 is an explanatory view of ions emitted from an object to be measured.

As shown in FIG. 10, an analysis system 1b comprises a CCD 31b which serves as an image sensor, a CCD driving circuit 32, a deflection electrode 46 which serves as an imaging system, a mass analysis unit 56 which serves as an analysis device, and a signal superposing circuit 61b and monitor 62b which serve as a display device, and also comprises a pulse voltage generator 21 for supplying a pulse voltage to the object 2, an oscilloscope 57 for displaying analysis data of the mass analysis unit 56, and a marker signal generator 81 which serves as a marker signal generating device.

The respective units of the analysis system 1b will be explained in detail below. In the analysis system 1b, at least two closed spaces 11 and 12 are defined adjacent to each other. The closed space 11 is a space in which the object 2 is set, and is made to emit ions, and the closed space 12 is a space in which the mass of some of ions emitted from the object 2 is detected. For example, the object 2 is set to extend through the side wall of the closed space 11, so that the portion to be analyzed of the object 2 protrudes into the closed space 11. In this case, the object 2 having a rod shape is used. The pulse voltage generator 21 and a high-voltage power source 22 are connected to the object 2 set in the closed space 11, and can supply high-voltage pulses of a positive potential. When the high-voltage pulses are supplied to the object 2, a strong electric field is formed on the surface of the object 2, and various kinds of atoms on the surface of the object 2 are ionized and emitted from the object 2, as shown in FIG. 11. The emitted ions are accelerated along the electric field formed on the surface of the object 2, and impinge on the CCD 31b it placed at the boundary between the closed spaces 11 and 12, thus projecting them as an ion image in an enlarged scale.

The deflection electrode 46 is arranged in the closed space 11. By controlling a voltage applied across plates of this deflection electrode 46, the formed ion image can be arbitrarily moved on an image sensing surface 33 of the CCD 31b. As the CCD 31b, a back-incident type is used as in the second embodiment. An output video signal from the CCD 31b is input to the CCD driving circuit 32 arranged outside the closed space 12. On the other hand, the mass analysis unit 56 is provided behind the CCD 31b. The mass analysis unit 56 detects the kinds and quantities of ions that have passed through the aperture 34 of the CCD 31b, and has a structure in which a micro-channel plate 56a and anode 56b are arranged in the closed space 12. The micro-channel plate 56a generates electrons by receiving ions that have passed through the aperture 34 of the CCD 31b, and amplifies and outputs those electrons. The micro-channel plate 56a is spaced a predetermined distance from the CCD 31b in a direction opposing the CCD 31b. The anode 56b is disposed behind the micro-channel plate 56a, and can detect electrons which are amplified and output from the micro-channel plate 56a. Furthermore, a power source is connected to the micro-channel plate 56a and anode 56b to set the entrance and exit surfaces of the micro-channel plate 56a and the anode 56b at a predetermined potential, so that ions coming from the CCD 31b enter the micro-channel plate 56a to produce and amplify electrons, which are extracted as an output from the anode 56b.

The detection signal from the anode 56b is input to the oscilloscope 57 arranged outside the closed space 12, and a sync signal from the pulse voltage generator 21 is also input to the oscilloscope 57. For this reason, the oscilloscope 57 can display the kinds and quantities of ions emitted from the object 2. More specifically, since ions that have passed through the CCD 31b have different times of arrival at the micro-channel plate 56a depending on their types, when different kinds of ions are emitted from the object 2, the anode 56b detects those kinds of ions with predetermined time differences. As a result, the oscilloscope 57 displays a waveform defined by the abscissa that plots the drift time which indicates the kind of ion, and the ordinate that plots the voltage which represents the quantity of ion.

Outside the closed spaces 11 and 12, the signal superposing circuit 61b, marker signal generator 81, and monitor 62b are disposed, and they use the same ones as those in the first and second embodiments.

The operation of the analysis system 1b will be explained below.

As shown in FIG. 10, the object 2 as a measurement target is set in the closed space 11 to protrude therefrom. The closed spaces 11 and 12 are then set in vacuum. Also, predetermined voltages are applied to the object 2, micro-channel plate 56a, and anode 56b by energizing the high-voltage power source 22 and the like. In this state, the pulse voltage generator 21 outputs a pulse voltage to input high-voltage pulses to the object 2. Thus, a large number of ions are produced on the surface of the distal end of the object 2, as shown in FIG. 11. A group of ions are emitted from the surface of the object 2 and are output toward the CCD 31b by the electric field formed in the closed space 11 shown in FIG. 10. An ion beam is accelerated along the electric field formed along the surface of the object 2, and is projected onto the CCD 31b in an enlarged scale.

The CCD 31b performs ion-electron conversion in accordance with the formed ion image of the object 2, and outputs an electric video signal corresponding to the spatial distribution image of ions. The video signal is input from the CCD 31b to the CCD driving circuit 32 outside the closed space 11, and is amplified. The amplified signal is output from the CCD driving circuit 32. On the other hand, some components of the ion beam imaged on the CCD 31b travel past the CCD 31b via the aperture 34 formed on it. That is, an ion beam that cannot be split by a half mirror or the like can be sampled by forming the aperture 34.

The ions that have traveled past the CCD 31b enter the mass analysis unit 56. More specifically, the ions that have left the aperture 34 travel in the closed space 12 toward the micro-channel plate 56a, and make the micro-channel plate 56a produce electrons. The produced electrons are amplified, and are then detected by the anode 56b. In this case, since various kinds of ions have different times of arrival at the anode 56b depending on their masses, the kind of ion can be determined based on the arrival time (drift time) difference, and the quantity of ion can be measured based on the detected quantity of each arrival time. The output signal detected by the anode 56b is input to the oscilloscope 57, which displays the kinds and quantities of ions contained in the object 2.

The video signal output from the CCD driving circuit 32 and a marker display signal output from the marker signal generator 81 are input to the signal superposing circuit 61b, which superposes the input signals and inputs the superposed signal to the monitor 62b. In this case, the marker display signal is superposed on the signal portion of the aperture 34 in the video signal. For this reason, the monitor 62b displays a two-dimensional ion image of the object 2 on the basis of the video signal component, and indicates the analysis position of analysis data displayed on the oscilloscope 57 as a marker.

Furthermore, when the two-dimensional ion image projected from the object 2 is moved on the CCD 31b by applying an appropriate voltage across the plates of the deflection electrode 46, and the position to be analyzed is adjusted to the aperture 34 of the CCD 31b, analysis data at the desired position can be obtained.

As described above, according to the analysis system 1b, since the two-dimensional image of the object 2, analysis data, and the marker indicating the sampling position are simultaneously displayed via the monitor 62b and oscilloscope 57, observation of the surface shape of the object 2, and measurement of ion emission at a desired position of the object 2 can be done at the same time, and the state, nature, and the like of the object 2 can be easily recognized.

In the above description, the anode 56b is arranged immediately behind the CCD 31b. In order to improve the resolution of the mass analyzer, the same deceleration electron optical system 47 or 47' as that used in the second embodiment shown in FIG. 8 or 9 is inserted to decelerate ions to assure long drift times.

(Fourth Embodiment)

Finally, the fourth embodiment of the analysis system will be explained below with reference to FIG. 12. An analysis system 1c according to this embodiment uses a streak camera 58 as an analysis device, so as to allow observation of a two-dimensional image of fluorescence emitted from the object 2, and measurement of the lifetime of fluorescence.

Figure 12:
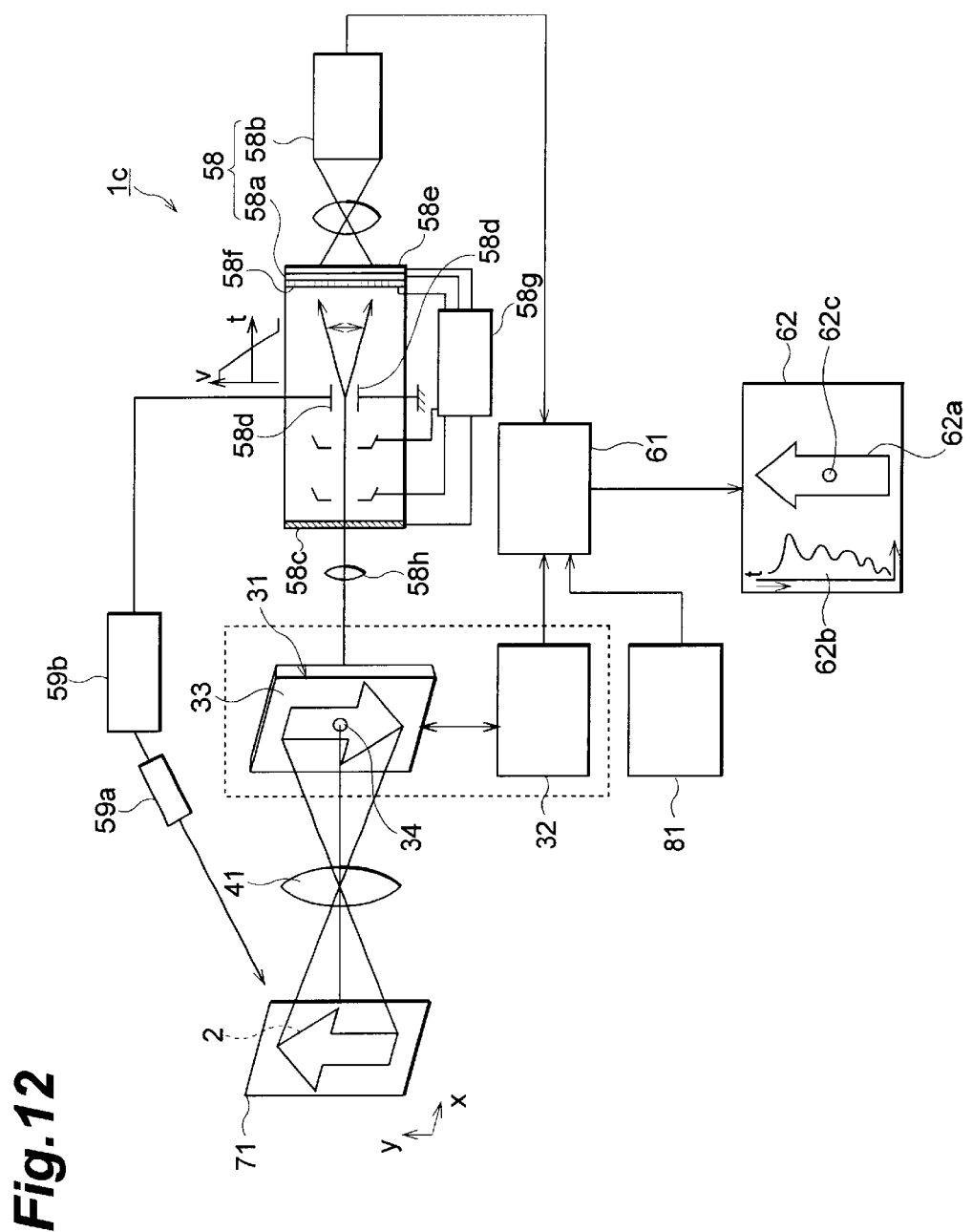
FIG. 12 is an explanatory view of a fluorescence lifetime measurement apparatus using a streak camera as the fourth embodiment of the present invention.
Figure 13:
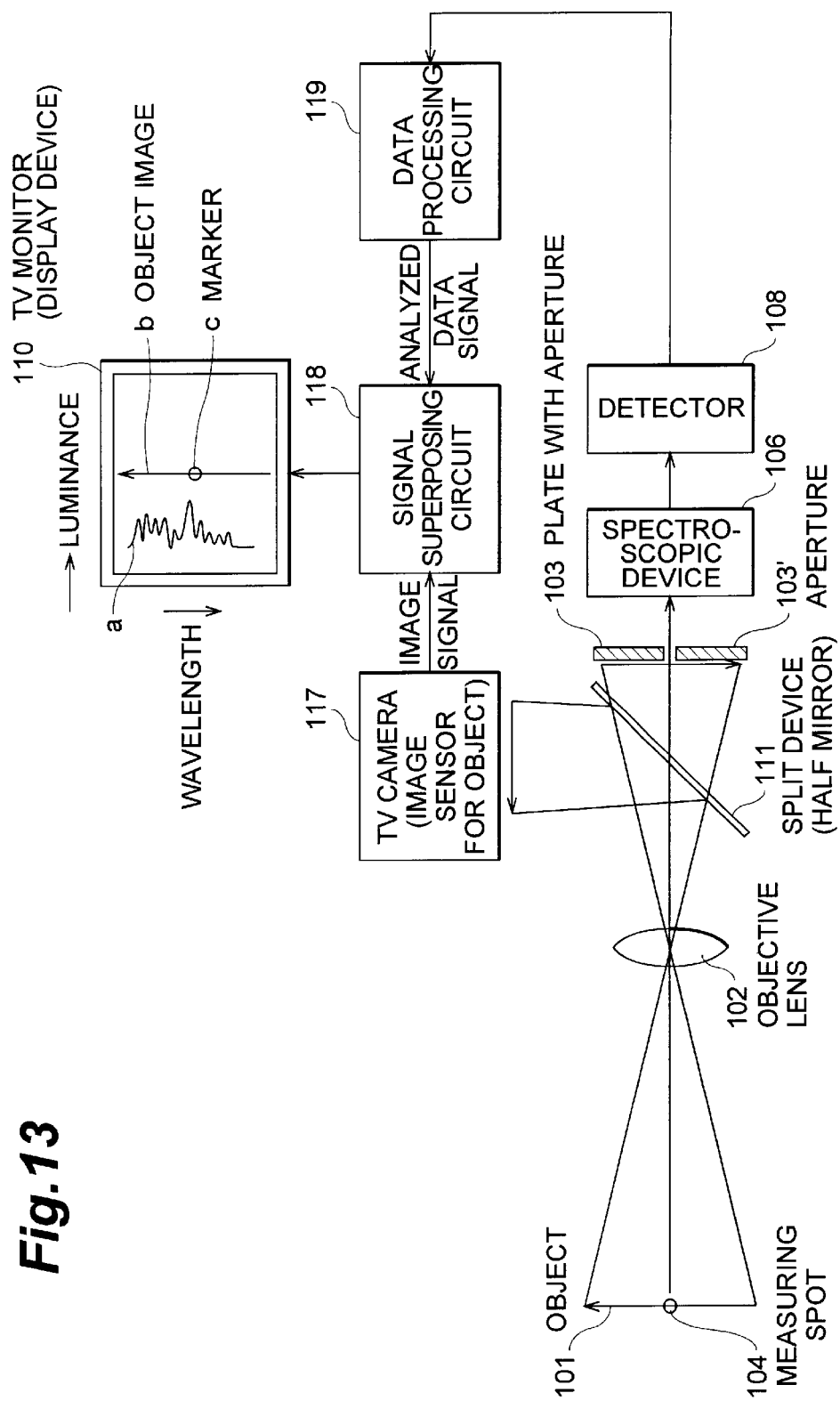
FIG. 13 is an explanatory view of a conventional apparatus which simultaneously performs image detection and analysis of an object to be measured.

As shown in FIG. 12, a CCD 31 that serves as an image sensor, a CCD driving circuit 32, an optical lens system 41 that serves as an imaging system, a signal superposing circuit 61 and monitor 62 that serve as a display device, an X-Y stage 71 on that the object 2 is set, and a marker signal generator 81 that serves as a marker signal generating device, which are provided to the analysis system 1c, are the same as those in the first embodiment.

The streak camera 58 which serves as an analysis device comprises a streak tube 58a and camera 58b, as shown in FIG. 12. The streak tube 58a receives on a photoelectric surface 58c some fluorescence components which are emitted from the object 2 and have passed through an aperture 34 of the CCD 31 to convert them into electrons, sweeps the path of electrons by changing an internal electric field upon changing an input voltage to a deflection plate 58d, and outputs a change over time in quantity of incoming fluorescence as a change in luminance on a fluorescent surface 58e. Note that reference numeral 58f in FIG. 12 denotes a micro-channel plate which amplifies electrons. Also, reference numeral 58g denotes a power source which supplies a voltage to the respective sections of the streak tube 58a to move electrons.

A laser 59a is disposed near the X-Y stage 71. When the object 2 on the X-Y stage 71 is irradiated with a pulse laser beam output from this laser 59a, it emits fluorescence. A laser driver 59b is connected to this laser 59a to supply a driving voltage to the laser 59a. The laser driver 59b also supplies a sweep voltage to the deflection plate 58d to synchronize the electric field formed in the streak tube 58a with fluorescence emitted from the object 2. For example, the laser driver 59b includes a laser driving power source circuit and deflection circuit. When a pulse voltage generated by the laser driving power source circuit is output as a driving voltage to the laser 59a, and a trigger signal synchronous with that pulse voltage is input from the laser driving power source circuit to the deflection circuit, electric field formation in the streak tube 58a is synchronized with fluorescence emission from the object 2. An optical lens system 58h is inserted between the CCD 31 and streak tube 58a to image fluorescence that has gone through the CCD 41 onto the photoelectric surface 58c.

The camera 58b senses the luminance state on the fluorescent surface 58e, and inputs the image of the luminance state of the fluorescent surface 58e and outputs it as an electric analysis data signal. A known TV camera or the like is used as the camera 58b.

The operation of the analysis system 1c will be described below.

As shown in FIG. 12, the object 2 as a measurement target is set on the X-Y stage 71, and predetermined voltages are supplied to the respective sections of the streak tube 58a. In this state, the laser 59a outputs a pulse laser beam, with which the object 2 is irradiated. Upon being irradiated with the laser beam, the object 2 emits fluorescence. This fluorescence is imaged on the image sensing unit 33 of the CCD 31 via the optical lens system 41.

The CCD 31 makes photoelectric conversion in accordance with the formed fluorescence image of the object 2, and outputs an electrical video signal corresponding to a light ray image. The video signal is input from the CCD 31 to the CCD driving circuit 32, and is amplified. The amplified signal is output from the CCD driving circuit 32.

On the other hand, some components of fluorescence that forms an image of the object 2 on the CCD 31 travel past the CCD 31 via the aperture 34. The fluorescence that has traveled past the CCD 31 enters the streak camera 58 as sampling fluorescence. The streak tube 58a of the streak camera 58 outputs a change over time in incoming fluorescence intensity as images having different luminance levels (streak images). These streak images are converted into an electrical analysis data signal by the camera 58, and the converted signal is output.

The video signal output from the CCD driving circuit 32, the analysis data signal output from the camera 58b, and a marker display signal output from the marker signal generator 81 are input to the signal superposing circuit 61, which superposes the input signals and inputs the superposed signal to the monitor 62. In this case, the marker display signal is superposed on the signal portion of the aperture 34 in the video signal. The signal superposing circuit 61 outputs the superposed signals of the input signals to the monitor 62, which simultaneously displays a two-dimensional image 62a of the object 2 on the basis of the video signal component, analysis data 62b indicating a fluorescence lifetime on the basis of the analysis data signal component, and a marker 62c indicating the analysis position of the analysis data 62b, as shown in FIG. 7.

In this manner, according to the analysis system 1c, observation of the surface shape of the object 2, and measurement of a fluorescence lifetime at a desired position of the object 2 can be simultaneously done, and the state, nature, and the like of the object 2 can be easily recognized.

Note that the aforementioned analysis system 1c may display the two-dimensional image 62a of the object 2 and analysis data 62b on different display means. That is, the analysis data signal output from the data processing circuit 53 need not always be superposed by the signal superposing circuit 61, and the two-dimensional image 62a of the object 2 and analysis data 62b may be displayed on different display means by connecting a display means such as a monitor, X-Y plotter, or the like to a data processing circuit 53 in addition to the monitor 62 connected to the signal superposing circuit 61.

As described above, according to the present invention, the following effects can be obtained.

Since the aperture is formed on the image receiving surface of the image sensing means, some of light rays and the like that strike the image receiving surface via the aperture can be sampled as those for analysis while observing a two-dimensional image of light rays or the like emitted from the object. For this reason, not only light rays, but also radiation, electrons, ions, or the like can be sampled.

Also, no half mirror or the like is required to sample them. For this reason, the characteristics of light rays or the like never change. Hence, the characteristics of the object can be accurately measured.

Furthermore, since the marker is displayed at the position of the aperture formed in the image sensing means upon observation of the object, the analysis position of analysis data can be accurately indicated by the marker.

Figure 14:
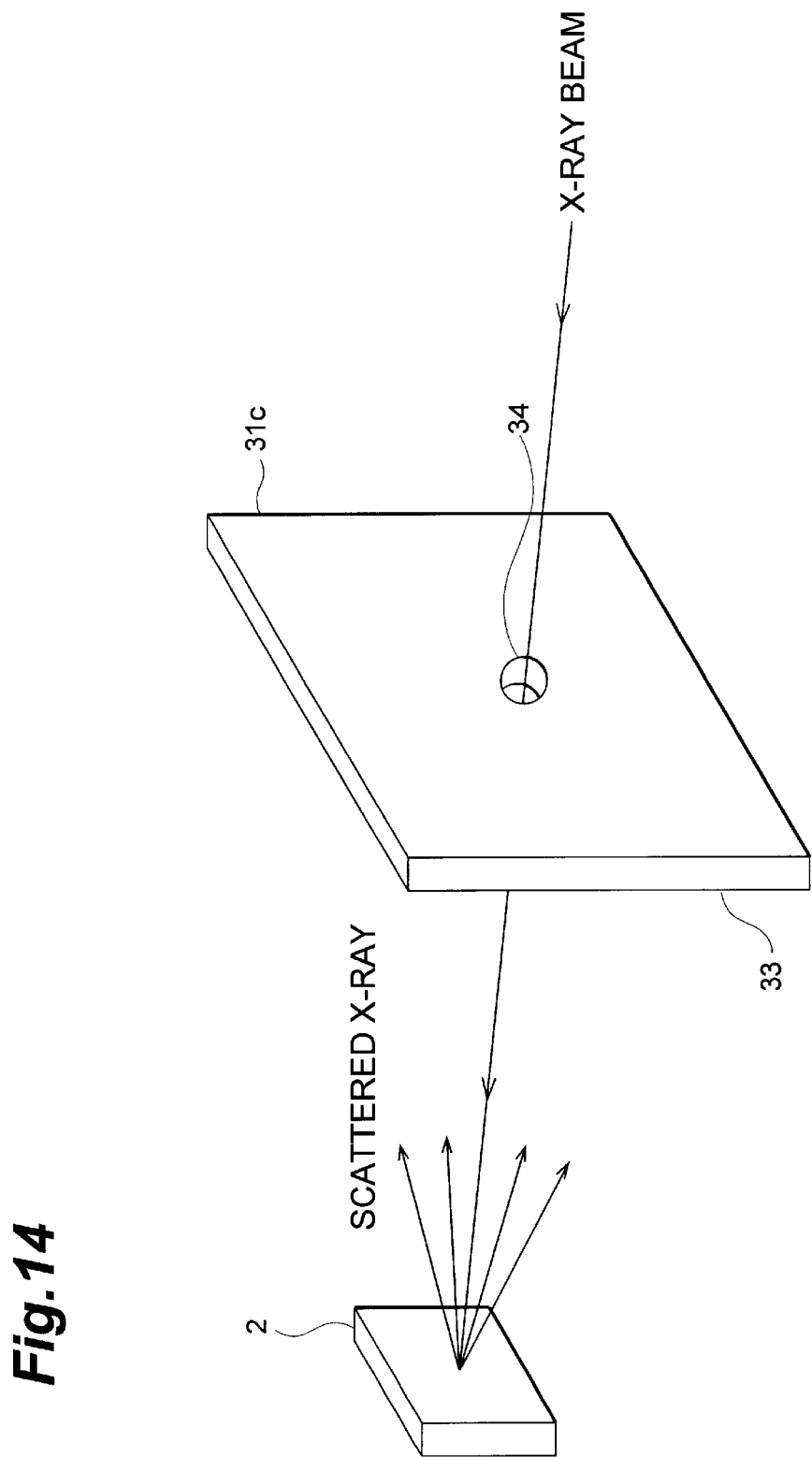
FIG. 14 is a view showing another use pattern of the solid-state image sensor of the present invention.

A solid-state image sensor with an aperture according to the present invention can be used in confirmation of the analysis position or distribution when an apparatus for analyzing the characteristics of a substance using light, radiation, electrons, ions, or the like analyzes details of the characteristics at a predetermined position while confirming the analysis position or distribution of such light, radiation, or the like. The application of the solid-state image sensor of the present invention is not limited to the aforementioned analysis apparatuses, and can be used in place of various apertures or the like. For example, as shown in FIG. 14, an X-ray beam having a small beam size is emitted from a surface opposite to an image receiving surface 33 of a solid-state image sensor 31c to impinge on the surface of a sample 2 that faces the image receiving surface 33 via an aperture 34 of the image sensor 31c. With this arrangement, a two-dimensional image of X-rays scattered by the surface of the sample 2 can be sensed without using a complicated X-ray optical system.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A solid-state image sensor which converts an image that represents a spatial distribution of light, radioactive rays, electrons, or ions incident on an image receiving surface into an image signal by pixels arranged in a two-dimensional matrix on a substrate, wherein said solid-state image sensor is provided with an aperture which extends from the pixel matrix area through the substrate, and a signal transfer path for reading an image signals from each pixel kept clear of said aperture.

2. A solid-state image sensor according to claim 1, wherein an image sensing unit of said solid-state image sensor is divided into at least two regions by a boundary including said aperture, and said solid-state image sensor is provided with individual registers each for respective region to transfer and read image signals from the respective pixels.

3. A solid-state image sensor according to claim 1, wherein said solid-state image sensor is back-incident type solid-state image sensor which is provided with electrodes for transferring image signals from the pixels on an opposite side of the image receiving surface.

4. An analysis system comprising:

a solid-state image sensor according to claim 1;

an imaging system, inserted between said image sensor and an object to be measured, for forming the image of said object on said image receiving surface of said image sensor;

an analysis device for analyzing a characteristic of said object from light rays, radioactive rays, electrons, or ions that have passed through said aperture, and converting analyzed result into an analysis data signal; and a display device for displaying an image corresponding to the image and the analysis data on the basis of an image signal output from said image sensor and the analysis data signal output from said analysis device.

5. An analysis system according to claim 4, further comprising marker signal generating device for generating a marker display signal to be superposed on a signal portion corresponding to said aperture in the image signal in synchronism with the image signal output from said image sensor, and wherein said display device simultaneously displays a two-dimensional image corresponding to the image of light rays, radioactive rays, electrons, or ions, and a marker indicating an analysis position of said analysis device on the displayed image on the basis of the marker display signal output from said marker generating device.

6. An analysis system according to claim 4, wherein said object is set to be movable relative to the image receiving surface of said solid-state image sensor.

7. An analysis system according to claim 4, wherein the image receiving surface of said solid-state image sensor is movable relative to said object.

8. An analysis system according to claim 4, wherein said analysis device comprises a spectroscope for analyzing wavelength components of light rays or radioactive rays emitted from said object.

9. An analysis system according to claim 8, wherein said imaging system comprises an optical system including an optical lens, prism, or mirror, and at least one of the components of the optical system is movable relative to said object or said solid-state image sensor.

10. An analysis system according to claim 4, wherein said analysis device comprises an energy analyzer for measuring an energy of light rays, radioactive rays, electrons, or ions emitted from said object.

11. An analysis system according to claim 4, wherein said analysis device comprises a mass analyzer for analyzing a mass of radioactive rays or ions emitted from said object.

12. An analysis system according to claim 10, further comprising, between said solid-state image sensor and said analysis device, an electron optical system for decelerating electrons or ions that have passed through said aperture.

13. An analysis system according to claim 4, wherein said analysis device comprises a streak camera for measuring a change over time in amount of light emitted from said object.

14. An analysis system according to claim 13, wherein said imaging system comprises an optical system including an optical lens, prism, or mirror, and at least one of the components of the optical system is movable relative to said object or said solid-state image sensor.

15. An analysis-apparatus according to claim 10, wherein said imaging system comprises a deflector for forming an arbitrary magnetic field or electric field between said object and said solid-state image sensor.

16. An analysis apparatus according to claim 11, wherein said imaging system comprises a deflector for forming an arbitrary magnetic field or electric field between said object and said solid-state image sensor.

17. An analysis apparatus comprising of:

an X-ray source; and a solid-state image sensor according to claim 1 disposed between said X-ray source and a target to be measured so that said aperture is located on the straight line connected said X-ray source and target.

* * * * *